United States Patent [19]

Shihabi

[11] 4,020,861

[45] May 3, 1977

[54] VAPOR RECOVERY VALVE

[75] Inventor: Marwan S. Shihabi, Northridge, Calif.

[73] Assignee: International Telephone and Telegraph Corporation, New York, N.Y.

[22] Filed: Aug. 20, 1975

[21] Appl. No.: 606,312

Related U.S. Application Data

[60] Division of Ser. No. 494,391, Aug. 19, 1974, abandoned, which is a continuation-in-part of Ser. No. 439,225, Feb. 4, 1974, abandoned, which is a continuation-in-part of Ser. No. 429,555, Jan. 2, 1974, abandoned.

[52] U.S. Cl. .............................. 137/100; 137/269; 141/46; 141/59; 251/282

[51] Int. Cl.² .......................................... F16K 17/00

[58] Field of Search ............ 137/100, 269; 141/59, 141/290, 46; 251/282

[56] References Cited

UNITED STATES PATENTS

| | | | |
|---|---|---|---|
| 1,363,513 | 12/1920 | Keith | 137/100 |
| 2,382,625 | 8/1945 | Garretson | 137/100 X |
| 2,641,105 | 6/1953 | Drake | 137/100 UX |
| 2,705,046 | 3/1955 | Schroeder | 251/61.4 X |
| 3,047,003 | 7/1962 | Gurney | 137/100 |
| 3,207,422 | 9/1965 | Best | 137/100 X |
| 3,256,740 | 6/1966 | Tate et al. | 137/85 X |
| 3,493,005 | 2/1970 | Kakegawa | 137/100 |
| 3,667,494 | 6/1972 | Haase | 137/100 |
| 3,815,327 | 6/1974 | Viland | 141/290 X |
| 3,850,208 | 11/1974 | Hamilton | 141/290 X |

*Primary Examiner*—Alan Cohan
*Assistant Examiner*—Gerald A. Michalsky
*Attorney, Agent, or Firm*—A. Donald Stolzy

[57] ABSTRACT

A flow control valve particularly useful for a vapor recovery system of a gasoline station. Gasoline and gasoline vapor flow through separate passages in the valve. A restriction (venturi) is provided in the gasoline passage so that a pressure differential will be produced in the passage as a function of the rate of flow of gasoline passing therethrough. A first diaphragm carrying a valve element which controls the flow of fluid through the vapor passage is responsive to said pressure differential so that the flow rate of vapor passing through the valve will be proportional to the flow rate of gasoline. In each of two alternative embodiments, another diaphragm responsive to gasoline pressure is ganged to the valve to compensate for gasoline pressure variations. In a further embodiment, the vapor control valve operates in an "on-off" mode so that a maximum vapor "draw back" is effected whenever gasoline flow of any magnitude is extant.

2 Claims, 6 Drawing Figures

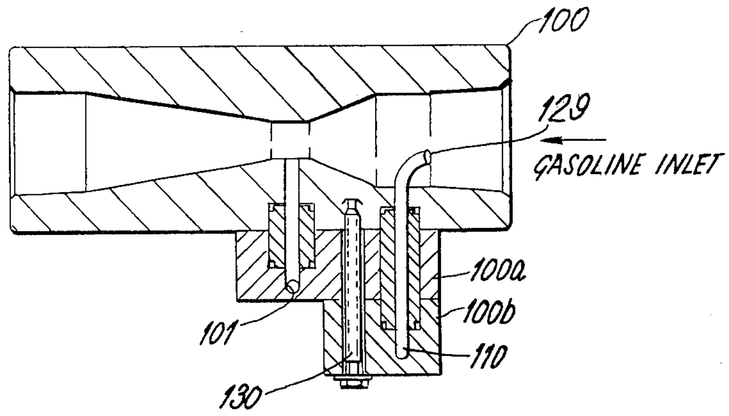
FIG. 4.
FIG. 5.
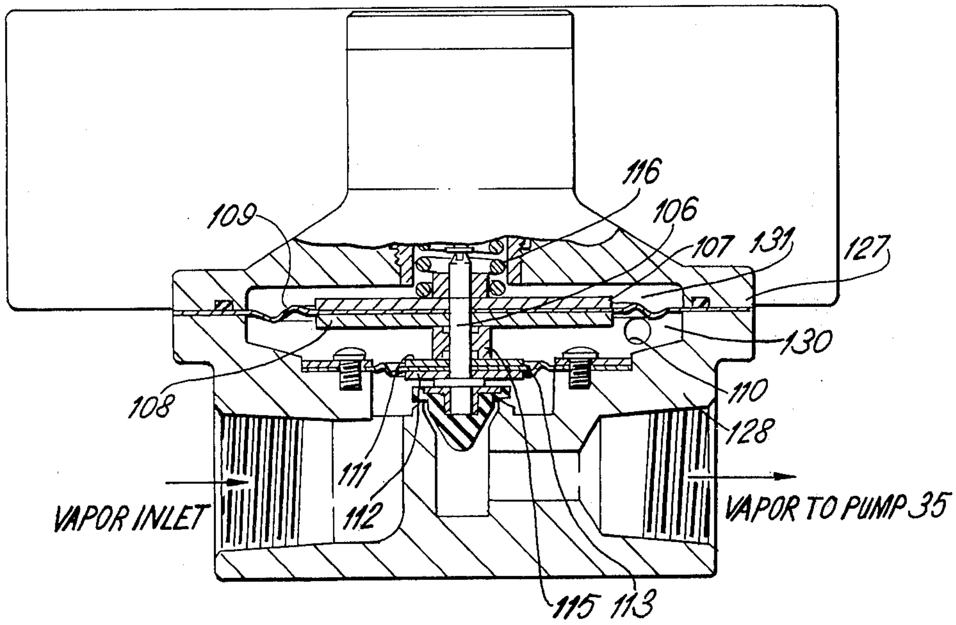

VAPOR RECOVERY VALVE

This application is a divisional application of copending application Ser. No. 494,391 filed Aug. 19, 1974 now abandoned. The said application Ser. No. 494,391 filed Aug. 19, 1974, for VAPOR RECOVERY VALVE by M. S. Shihabi, is, in turn, a continuation-in-part of abandoned applicaton Ser. No. 439,225 filed Feb. 4, 1974, for VAPOR RECOVERY VALVE by M. S. Shihabi. The said application Ser. No. 439,225 was, in turn, a continuation-in-part of abandoned application Ser. No 429,555 filed Jan. 2, 1974, for FLOW CONTROL VALVE by M. S. Shihabi.

In accordance with the foregoing, the benefit of the filing dates of all of said applications Ser. Nos. 494,391, 439,225 and 429,555 is hereby claimed for this application.

BACKGROUND OF THE INVENTION

The present invention relates generally to a flow control valve and, more particularly, to a valve for maintaining the fluid flow rate in a first line at least proportional to the fluid flow rate in a second line.

The present invention will be described herein as being a part of a gasoline station vapor recovery system. However, it will be appreciated that the invention may find numerous applications, whatever it is necessary to maintain the rate of flow of fluid in one line at least proportional to the rate of flow of fluid in another line. The valve may be utilized for controlling the flows of two liquids, two gases, or a gas and a liquid.

Recent Federal regulations require that gasoline stations be provided with vapor recovery systems. In such a system, gasoline vapor collected in an automobile gasoline tank, during filling of the tank with gasoline, is drawn therefrom through a suction line into the gasoline dispensing unit or pump. A blower (pump) conveys the vapor from the unit to a condenser, where it is condensed and the condensate is returned to a gasoline storage tank. The purpose of such vapor recovery system is to minimize the escape of gasoline vapors into the atmosphere and, hence, prevent consequent air pollution.

It is desirable that a flow control valve be employed in the vapor line of the vapor recovery system which will control the flow of vapor from the automobile gasoline tank at least proportional to the flow of gasoline into the tank. At the present time, this is accomplished by the use of either two solenoid valves or a single solenoid valve combined with a flow responsive switch. Because the valves are electrically operated, they must be explosion-proof, which adds considerably to their cost. Also, the solenoid valves do not inherently modulate. Thus, it has been necessary to electrically modulate the solenoid valves to obtain the appropriate control function. Such modulation, however, considerably shortens the life of the solenoid valves, and is difficult to attain with any reasonable precision.

Therefore, what is needed and constitutes the principal object of the present invention is an improved flow control valve for use in a gasoline station vapor recovery system or the like. The valve should be simple in construction, automatically modulate or switch, and not require electrically controlled solenoids or switches which add to the expense of presently known flow control valves.

SUMMARY OF THE INVENTION

According to an embodiment and variations thereof, there is provided a flow control valve for maintaining the fluid flow rate in a first line proportional to the fluid flow rate in a second line. In the specific application of the valve disclosed herein, the flow rate of gasoline vapor is controlled so as to be proportional to the flow rate of gasoline introduced into an automobile gasoline tank in a gasoline station vapor vecovery system. The valve comprises a housing having a pair of flow passages, one adapted to be coupled to the gasoline flow line and the other adapted to be connected to the vapor flow line. A restriction (venturi) is formed in the gasoline passage for producing a pressure differential proportional to the rate of flow of gasoline passing therethrough. A cavity is formed in the housing which is divided into at least two separate sections by a sealed movable member, such as a flexible diaphragm. Passages connect the two cavity sections to the restriction and an unrestricted portion, respectively, of the gasoline flow passage so that the diaphragm is responsive to the differential pressure created by the flow of gasoline through the gasoline passage. A valve element fixed to the diaphragm controls the flow of vapor through the vapor passage. Normally the valve elememt prevents the flow of vapor through the valve. Upon flow of gasoline through the gasoline passage in the valve, the pressure differential created thereby acts on the diaphragm in the valve causing the diaphragm to move a distance proportional to the rate of flow of gasoline through the valve, thus shifting the valve element allowing vapor to pass through the vapor passage at a rate proportional to the rate of flow of gasoline passing through the valve. The valve inherently modulates.

Three forms of this general configuration are shown and described, as well as an "on-off" version providing as much or more vapor pull back as needed for any gasoline flow situation.

Hence, by use of the pressure differential arrangement, solenoid valves are eliminated thereby substantially lowering the cost and simplifying the operation of the control valve of the present invention.

BRIEF DESCRIPTION OF THE DRAWINGS

FIG. 4 is a sectional view of a further embodiment;

FIG. 5 is a vertical sectional view, partly in elevation, of an alternative embodiment of the present invention.

DESCRIPTION OF THE PREFERRED EMBODIMENTS

Figure 1:
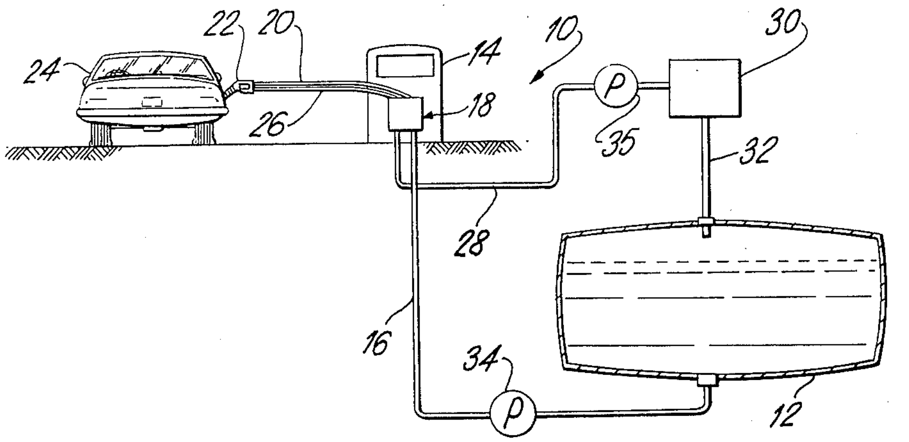
FIG. 1 is a schematic diagram of a simplified form of a gasoline station vapor recovery system.

Referring now to FIG. 1 in detail, the numeral 10 generally designates a gasoline station recovery system including a gasoline storage tank 12 and a dispensing pump 14. A line 16 connects the tank 12 to a flow control valve 18 within the pump unit 14. A second line 20 in communication with the line 16 through the valve 18 terminates in a conventional nozzel 22 which is shown inserted within the gas tank of an automobile 24. A vapor line 26 also extends from the valve 18 to the nozzle 22. The end of the line 26 extends into the gas tank when the nozzle is mounted therein for withdrawing vapor from the space above the gasoline in the tank. A second vapor line 28 in communication with the line 26 through the valve 18 is connected to a condenser 30. A line extends from the condenser back to the storage tank 12. A pump 34 is provided in the line 16 for pumping gasoline from the tank 12 through the line 16, flow control valve 18 and line 20 to the nozzle 22. A blower 35 is provided in the line 28 for creating a partial vacuum which draws vapor from the automobile gasoline tank through the line 26, control valve 18 and conveys the same to the condenser 30. There the vapor condenses and the condensate returns to the storage tank 12 via the line 32. The vapor recovery system described so far is entirely conventional and does not include the present invention.

Figure 2:
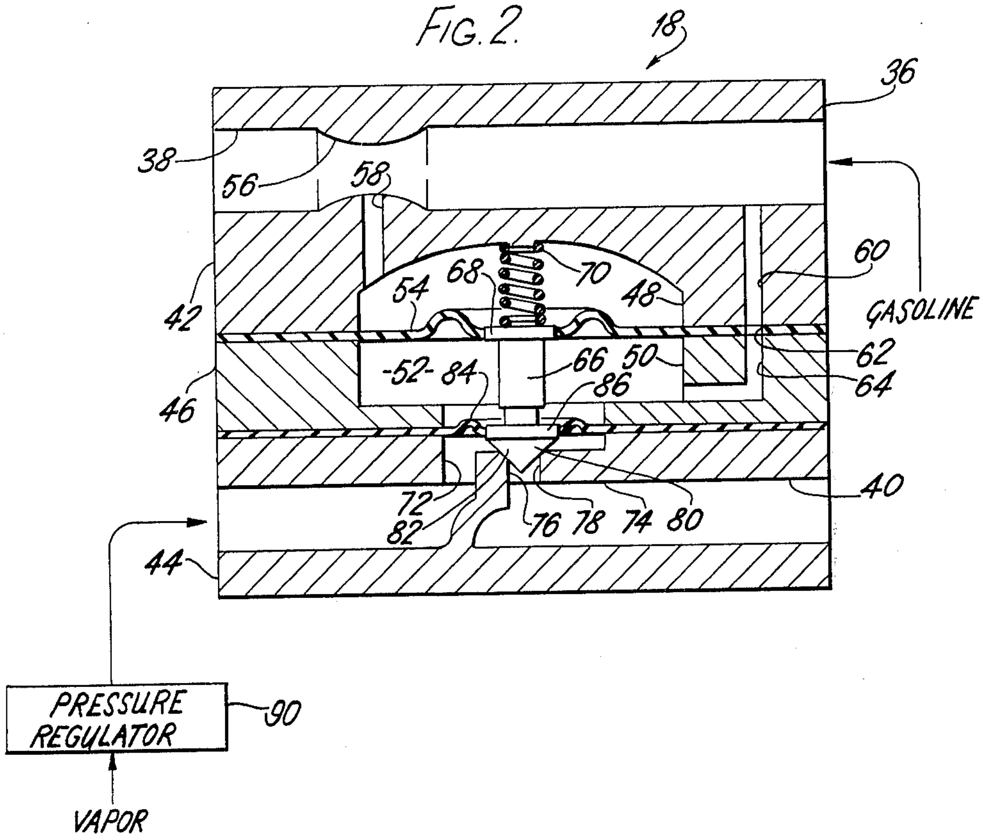
FIG. 2 is a sectional view of a simplified form of a flow control valve for use in the system illustrated in FIG. 1, and constructed in accordance with the present invention.

According to the present invention, there is provided an improved, simplified and inexpensive flow control valve assembly 18, shown (typically) in detail in FIG. 2. The valve commprises a housing 36 having a pair of passages 38 and 40 extending therethrough. The housng 36 may be formed of an assembly of metal parts, machined, cast or a combination of these, as will be seen. The passage 38 is connected to the lines 16 and 20 while the passage 40 is connected to the lines 26 and 28 of the vapor recovery system illustrated in FIG. 1. The housing 36, as illustrated, is comprised of three separate parts, an upper part 42, a lower part 44 and intermediate part 46. A cylindrical recess 48 is formed in the lower portion of the upper housing part 42. A second complementary recess 50 is formed in the upper portion of the intermediate housing part 46. The two recesses 48 and 50 cooperate to define a cylindrical cavity 52 between the passages 38 and 40.

A flexible diaphragm (of gasoline resistant rubber or the like) 54 is interposed between the upper part 42 and intermediate part 46 of the housing. This diaphragm separates the cavity 52 into upper and lower sections 52A and 52B, respectively.

A restriction 56 is provided in the passage 38. A vertical bore 58 extends from the restriction 56 to the space in cavity 52A above the diaphragm 54. A second bore 60 extends from an unrestricted portion of the passage 38 to the lower face of the upper housing part 42. This bore 60 could be on either side of restriction 56. An opening 62 is formed in the diaphragm 54 aligned with the bore 60. A passage 64 aligned with the bore 60 extends from the upper surface of the intermediate housing part 46 to the recess 52B thereby providing flow communication between an unrestricted portion of the passage 38 and the space in the cavity 52 below the diaphragm 54.

As will be appreciated, as fluid flows through the passage 38 the restriction 56 will create a pressure differential which is dependent upon the flow rate of fluid passing through the passage in accordance with the well known verturi principle. Obviously, the pressure in the recess 52b below the diaphragm 54 will be greater than the presence in the recess 48 above the diaphragm so that the pressure differential will act upon the diaphragm 54 to lift the same upwardly as viewed in FIG. 2.

A valve element 66 is coaxially positioned within the cavity 52. The upper end of the valve element is formed with a mounting disc 68 which is fixed and sealed to the diaphragm 54. A spring 70 in the recess 48 acts upon the disc 68 to urge the valve element 66 in the downward direction. The spring 70 provides only enough force to bias the valveclosed in the quiescent condition, but not enough to significantly resist the differential pressure on opposite sides of 54 during gasoline flow.

A bore 72 extends vertically downwardly from the cavity 52 into the vapor passage 40. A flange 74 formed in the housing extends inwardly into the bore 72. The flange joins a generally vertically extending wall 76 which extends as a barrier across the passage 40. A bore 78 extends vertically through the flange 74 coaxial with the axis of the cylindrical cavity 52. The edge of the flange 74 surrounding the upper end of the bore 78 forms a valve seat 80. The valve element 66, which is coaxial with the axis of the cavity 52 and the bore 78, is formed at its lower end with a conical member 82 engages the seat 80 under the biasing force of the spring 70 to normally prevent the flow of fluid through the passage 40. A second flexible rubber diaphragm 84 is interposed between the intermediate housing part 46 and lower part 44. The lower end of the valve element 66 is formed with a flange 86 above the conical portion 82. This flange is sealed to the diaphragm 84. The diaphragm 84 thus prevents fluid introduced into the cavity 52*b* via 60 and 64 form entering the bore 78 and passage 40. This is important in a gasoline station vapor recovery system wherein it is desirable not to have gasoline enter into the vapor return line.

As stated previously, the diaphram 54 is subjected to the pressure differential resulting from the flow of gasoline through the line 38. Such pressure differential is proportional to the rate of flow of gasoline through the valve. The area of the diaphragm 54 exposed to pressure in the recess 52*b* is greater than that of diaphragm 84, thus the diaphragm 54 will rise when the pressure below it exceeds that above, relatively independently of the incidental pressure differential between the two faces of diaphragm 84. The pressure differential created by flow of gasoline thus raises the diaphragm 54 thereby lifting the conical portion 82 of the valve element 66 upwardly off the valve seat 80, thereby permitting flow of vapor through the passage 40 at a rate which is a direct function of the rate of flow of gasoline through the valve.

The diaphragm 84 also provides a pressure regulating function for the valve. For example, if the pressure in the bore 72 below the diaphragm 84 decreases, pressure in the cavity 52*b* will cause the diaphragm and hence the valve element 66, to tend to move downwardly, tending to partially close the bore 78, causing the pressure in bore 72 to increase. Likewise, if the pressure in passage 40 increases to a level greater than that in cavity 52, the valve element will tend to lift off the seat 80 more than dictated by the gasoline flow rate to reduce the pressure in the passage.

Suitable fasteners, not shown, such as nuts and bolts, connect the three parts 42, 44 and 46, the diaphragms 54 and 84 into a unitary assembly. Also suitable sealing rings, not shown, may be provided in various parts of the valve housing, such as at the interconnection of the bore 60 and passage 64.

While it is not necessary for many applications, preferably a separate pressure regulator, shown schematically at 90 in FIG. 2 is provided with the valve 18 when the latter is employed in a vapor recovery system. Such regulator maintains the vacuum in the suction line 26 large enough to remove vapor out of the gasoline tank of the automobile yet small enough not to allow too much air to be drawn in from outside the tank which might create and explosive mixture. Any desired form of pressure regulator may be utilized. The pressure regulator is preferably upstream of the valve 18 and may be made an integral part of the valve.

While the embodiment disclosed herein utilizes flexible diaphragms as the movable pressure responsive members, it will be appreciated that the diaphragms may be replaced by slidable pistons sealed with O-rings if desired. This modification would be particularly useful if the valve is to be subjected to relatively high pressures.

Figure 3:
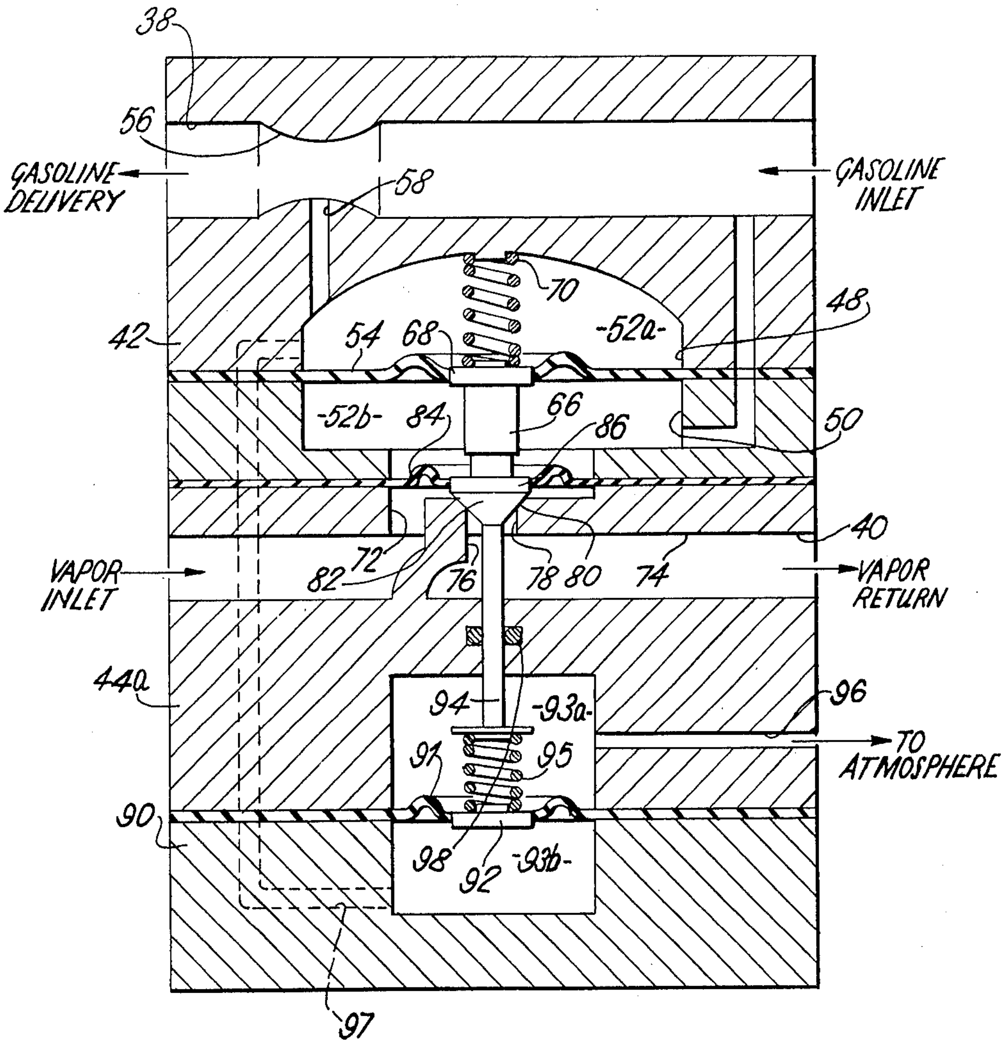
FIG. 3 is a sectional view of a flow control valve according to the invention, having integral compensation for gasoline pressure variations.

Referring now to FIG. 3, an embodiment of the device of the invention incorporating integral compensation for gasoline pressure variations will be described.

It will be noted from FIG. 2, that increases in gasoline pressure into the passage 38 can have the effect of biasing the entire valve member 66 downward, even though the differential across diaphragm 54 continues to be governed by the venturi effect generated in 56 as already described. This is true becauce gasoline pressure variation influences the differential across diaphragm 84, liquid gasoline being in contact with the upper surface of 84 without any counterbalancing from the vapor chamber below.

In the embodiment of FIG. 3, all parts which are substantial duplicates of parts shown on FIG. 2 are identified by like numerical legends. The description of such parts set forth in connection with FIG. 2 also applies to FIG. 3.

Basically, FIG. 3 incorporates a third diaphragm 91 separates chambers 93*a* and 93*b* formed between a modified housing or body member 44*a* and an additional housing or body member 90. These members 44*a* and 90 are joined in the same manner as are 42 and 46, as previously described.

A passage 97 connects chamber 52a to chamber 93b. Thus liquid gasoline from 52*a* exerts an upward force on 91 essentially proportional to gasoline pressure, since chamber 93*a* is directly vented to the atmoshphere through a passage 96.

It should be noted that passage 97 passes through portions of housing members 42, 46, 44*a* and 90, but does not communicate with any of the chambers or bores, its sole function being to connect chambers 52*a* and 93*b*.

The area of diaphragm 91 separating 93*a* and 93*b* is substantially the same as for diaphragm 84 within the bore below 52*b*.

A connector rod 94 serves to mechanically connect the conical valve member 82 to diaphragm 91 through a spring 95. The said spring 95 serves to permit variation of the mechanical relationship, although it could be replaced by a continuation of rod 94 to obtain a one-for-one motion relationship between 82 and 91. Such considerations would be matters of design.

A seal 98 prevents leakage between vapor passage 40 and chamber 93a. Leakage at that point is unlikely even with a minimal sealing effort, since only the difference between the vapor line returning to the suction pump 35 (see FIG. 1) and atmosphere is extant across seal 98.

Parts 68 and 92 serve essentially the same purposes.

In order to explain the operation of the additional structure of FIG. 3, the venturi pressure in chamber 52*a* will be called $P_V$, the vapor inlet pressure is $P_A$, and $P_o$ is atmospheric pressure.

The magnitude of $P_v - P_0$, which is the upward presure on 91, will be seen to be always smaller than the magnitude of $P_v - P_A$, the differential pressure acting on diaphragm 84 when the device is operating. The net effective force is $A_{91}$ $(P_0 - P_4)$ acting downward (in FIG. 3) and tending to restrict the vapor valve orifice (formed between 80 and 82). Since the effective areas of diaphragms 84 and 91 are substantially equal $P_v$ tends to balance out, making the device substantially independent of gasoline pressure variations. $A_{91}$ is the effective area of diaphragm 91.

The action described tends to afford regulation of the vapor inlet pressure with variation in suction or vapor exit pressure. An automatic trimming operation on the modulating position of the vapor valve due to modulation of gasoline flow rate is thereby achieved.

Diaphragm 91 may be of the same gasoline resistant rubber or like material as is used in the other diaphragms 54 and 84.

It is understood, of course, that thin metallic diaphragms could be used. Selection of materials is a matter of design within the ordinary skill of the art, suitable materials for all parts being readily selected. There are not critical material requirements.

Referring now to FIGS. 4 and 5, a third embodiment of the invention will be described. In the particular embodiment of FIGS. 4 and 5, the construction was such that the liquid gasoline venturi was somewhat offset pysically from the valve housing components. A housing section 100 is seen on FIG. 5, representing a centerplane sectional view of the valve functional parts, whereas FIG. 4 represents a sectional view taken behind that of FIG. 5 through the centerline of the liquid gasoline venturi. The exact relationship of these parts is, of course, a matter of design choice, and not a specific aspect of, or limitation on, the present invention, so long as the various passages and relationships which will be described hereinafter, are provided.

Figure 6:
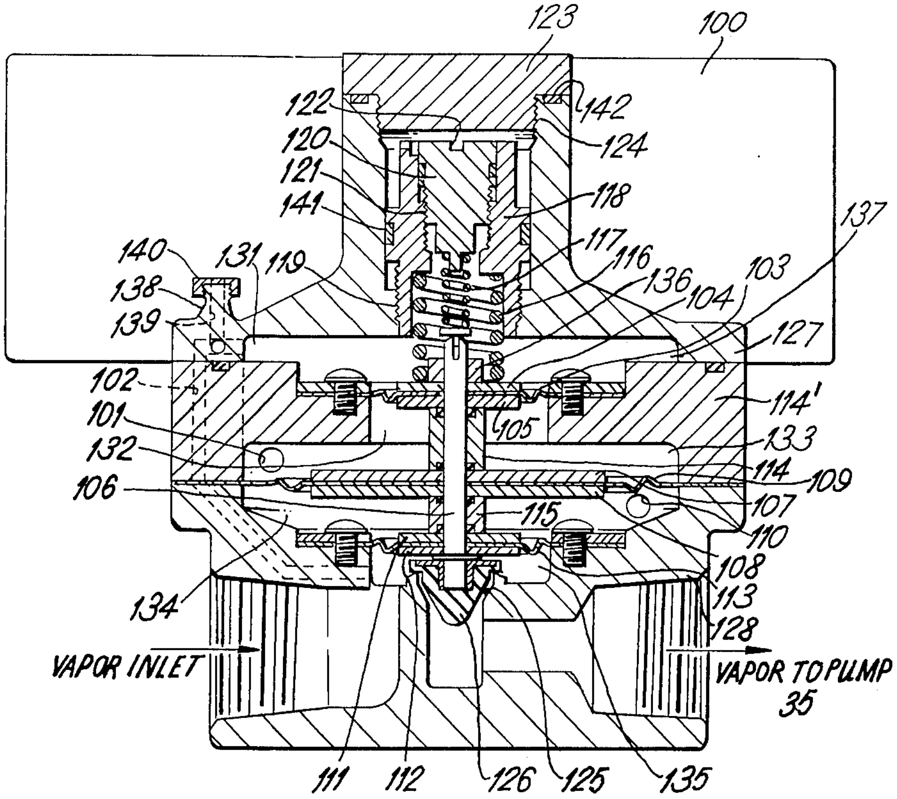
FIG. 6 is a sectional view of still another embodiment of the present invention.

In FIGS. 4, 5 and 6, it is to be understood that the same materials, all well known in these arts, are employed. The various housing parts might typically be aluminum alloy (or other non-ferrous alloy) castings. Well-known machining and fabricating operations provide the bores, threading, flat mating surface, etc., as required.

The housing parts 100*a* and 100*b* in FIG. 4 may be projections on the back of the housing assembly as illustrated in FIG. 5, joined to the venturi section body 100, typically via screwer bolt 130. In addition to general mechanical mounting considerations, these latter described parts provide for the ducts or passages 101 and 110, comparable to 58 and 60 in FIG. 2. The part 129 ("snorkel" tube) is an extension of the passage 110 for a purpose to be described hereinafter and is only applicable to the embodiment of FIG. 5 (to be described subsequently herein). In FIg. 4, the passage 110 breaks through the gasoline venturi wall as a side bore, comparable to 60 of FIG. 2, without the "snorkel" 129.

Referring further to FIG. 5, a simplified "on-off" version of the device is depicted. Here the regulator section 114 is omitted and the bonnet casing 127 is fitted onto 128. The annular chamber portion 137 diappears because the effective bores of 127 and 128 match.

A shorter spindle 106 is employed and the components above 104 in FIG. 6 are now adjacent to 107. Passage 102 is omitted by sealing or plugging the casting openings.

In FIG. 5, it is assumed that the vapor return pump 35 suction is relatively high, or that the gasoline delivery nozzle 22 is tightly fitted into the automobile tank filler pipe (as by a gasket or resilient collar). Gas entering the automobile tank during filling displaces the vapor in the tank and drives it back to the reservoir 12 without need for pump 35.

The snorket 129 may be seen to provide same fluid ram effect augmenting the pressure in chamber 131. The result is a maximum up movement of 106 and consequently, a maximum opening of the 126/125 valve opening.

Removal of the regulator section, as aforementioned, removes the liquid gasoline venturi connection and consequently no regulation of vapor return flow as a function of valve 126/125 opening is effected. The chamber 131 is preferably closed to avoid external gasoline or vapor leakage in the event of a failure of diaphragm 109.

Referring now to FIG. 6, a fourth embodiment of the invention will be described. This fourth embodiment presents certain practical advangtages vis-a-vis, the other embodiments hereinabove described. By rearranging the functional sub-assemblies of the overall valve assembly according to the invention, it has been possible, as shown in FIG. 6 particuarly, to eliminate sliding seals and to afford improved regulation in respect to gasoline pressure, so that potential conditions of lock-down of the main vapor valve due to high gasoline pressure are more effectively avoided. Moreover, the embodiment of FIG. 6 is less subject to the influence of the vapor blower pressure variations on the main vapor valve.

In the particular embodiment of FIG. 6, the construction was such that the liquid gasoline venturi was somewhat offset physically from the valve housing components. A housing section 100' is seen on FIG. 6 including apparatus identical to that shown in FIG. 4 without "snorkel" 129.

Referring again to FIG. 6, it will be noted at the outset that no sliding seals are employed. The spindle 106 carries the main vapor seal valve plunger 126 up and down, as illustrated, and with it, washers 111 and 112, bushing 115, washers 107 and 108, bushing 114, washers 104 and 105 and spring retaining washer 136. These movements produce flexure of diaphragms 103, 109 and 113 contemperaneously and in the same directional sense. The seals evident along the inside diameters of bushings 114 and 115 are fixed seals intended only to prevent inter-chamber leakage.

The valve housing comprises essentially three parts, namely, 127, 114' and 128. These sections are held together via conventional methods with entirely conventional sealing techniques applied. The section 114' comprises the liquid gasoline pressure compensator. The aforementioned spindle 106 and all the parts mechanically fixed thereto, which translate up and down (as viewed in FIG. 6) and do not rely on sliding seals or other sliding friction techniques to maintain their lateral alignment. Actually it will be apparent that the diaphragms 103, 109 and 113 easily afford sufficient lateral rigidity to maintain alignment of the spindle and related parts.

A valve seat 125 operating in cooperation with the main vapor valve plunger 126 is capable of metering the vapor flow from the vapor inlet and the outlet to the way to pump 35 interrupting it completely when the plunger is in the extreme downward position, as illustrated. Conversely, a variable flow of vapor through the main vapor passage in 128 from vapor inlet to vapor outlet is produced in accordance with the amount by which the plunger 126 is lifted during operation from the seat 125.

It will be noted that the interior cavities of the valve above the plunger 126 comprise a lower cavity 135 which is in communication with the vapor inlet; a chamber 134 constrained between diaphragms 109 and 113; a chamber including both 132 and 133 constrained between diaphragms 103 and 109; and finally, an upper chamber constrained between diaphragm 103 and the enclosure provided by upper housing (bonnet) member 127. The said upper housing member 127 downward facing concavity overlaps the member 114 producing a small annular extremity 137 as part of the cavity 131. The reason for this will be apparent hereinafter in connection with the description of FIG. 5.

Actually this annular cavity extension 137 serves no specific purpose in connection with the functioning of FIG. 6, but is provided in order to allow for conversion of the embodiment of FIG. 6 to that of FIG. 5. merely by partial disassembly, removal of certain parts and reassembly without modification or rework of any parts.

The housing part 127, together with the plug 123 emplaced in the top of 127, serve together as bonnet for the assembly.

It will be noted that a threaded insert sleeve part 118 is fitted within a central internal bore in the upper end of 127 and seated therein by means of a thread engagement 119. Part 118 is sealed via seal 141 against the internal bore of the aforementioned part 127. An internal shoulder on part 118 applies a compression bias on spring 116 tending to bias the spindle 106 downward (in the direction of closure of the 125/126 valve/seat arrangement). The amount of this spring bias may be adjusted in accordance with the extent of the thread engagement at 119. Part 118 will be seen to have its own internal bore above the said internal shoulder bearing on spring 116, this additional bore accommodating a threaded plug 120. The threaded plug 120 provides an additional adjustment of the resilient bias on the spindle 106 by means of spring 117 retained against the top of spindle 106 and a projection on the bottom of theaded plug 120. The extent of this compression bias may be adjusted by rotating the said threaded plug 120 and consequently the extent of the thread engagement 121. A screwdriver slot 122 is illustrated in this connection. Finally, the cap plug 123 seats in a counter bore and threaded upper portion of part 127, the threaded engagement being identified as 124; and the corresponding seal is 142.

A boss 138, forming a part of the bonnet casting 127, has a central bore 139 in communication with the passage 102, and is sealed by means of a threaded cap 140, preferably with the usual resilient O ring seal. The external communication with the passage 102 thereby afforded permits the attachment of a manometer or other instrument for the purpose of operationally adjusting the device specifically by rotation of threaded plug 120.

The passage 102 assumes essentially the vapor inlet pressure condition extant in the valve at any time, and this is an independent parameter of significance in connection with adjustment of the device.

Concerning operation of the device, it will be noted that the pressure differential across disphragm 109 is substantially only the true algebraic difference between the passage 101 and 110 pressures, i.e., it is a function only of the gasoline delivery rate through 100.

Gasoline input pressure variations are effectively balanced out across 109, and since the under side of diaphragm 103 and the upper side of 113 present the same area to the gasoline pressure, there is inherent cancellation of net forces due to liquid gasoline pressure changes. Still further, it will be noted that passage 102 serves to eqaulize the vapor pressure between chambers 131 and 135 (top of diaphram 103 and bottom of diaphragm 113) thus also providing inherent balancing out of force differentials resulting from vapor blower net pressure - as, for example, caused by variation in the number of gasoline pumps operating in parallel on the system at any time.

The snorkel 129 may now be seen to provide some fluid ram effect augmenting the pressure in chamber 130. The result is a maximum up movement of 106 and consequently, a maximum opening of the 126/125 valve opening.

Removal of the regulator section, as aforementioned, removes the liquid gasoline venturi connection and consequently no regulation of vapor return flow as a function of valve 126/125 opening is effected. The chamber 131 is preferably closed to avoid external gasoline or vapor leadakge in the event of a failure of diaphragm 109.

Obviously, the embodiments of FIGS. 5 and 6 could be constructed with sliding piston arrangements in lieu of the deflecting diaphragms, however, the diaphragms are simple, relatively inexpensive and free of surface sliding friction problems.

Although the present invention is considered particularly useful in retail gasoline vending, it is also obviously applicable to the vending of other liquid hydrocarbon fuels which are relatively volatile and thereby vaporize and produce air pollution if the vapors are allowed to pass into the atmoshper.

Variations and modifications within the scope of the invention, once its principles are understood, are of course possible. Accordingly, it is not intended that the specific embodiments shown should be regarded as defining the scope of the invention, the drawings and description being intended as illustrative only. Pistons may be substituted for one or more or all of the diaphragms disclosed herein, although one or more diaphragms may be used in combination with one or more pistons.

What is claimed is:

1. A control comprising: a valve housing including means defining first and second passage therethrough constructed to receive gasoline vapor and gasoline, respectively, said first passage being adapted to be coupled to a first line and said second passage being adapted to be coupled to a second line; a restriction in said second passage for producing a pressure differential proportional to the rate of flow of fluid passing through said second line, said housng being divided into first and second cavities by a movable member; first means providing flow communication between said first cavity and said restriction; second means providing flow communication between said second cavity and an unrestricted portion of said second passage whereby said movable member is subjected to said pressure differential; a valve seat formed in said first passage; and a valve element in said first passage fixed to said movable member and positioned to close said valve seat, said valve element shifting away from said valve seat in response to said pressure differential whereby the rate of flow of fluid passing through said first passage will be a predetermined function of the rate of flow of fluid passing through said second passage; and means biasing said valve element against said valve seat to normally prevent flow of fluid through said first passage.

2. The invention as defined in claim 1, wherein said valve element is fixed rigidly to said movable member so as to be immovable relative thereto.

* * * * *